United States Patent [19]

Yatsunami et al.

[11] 4,396,424
[45] Aug. 2, 1983

[54] METHOD FOR RECOVERING USEFUL METALS FROM DUST DISCHARGED FROM METAL REFINING METALLURGICAL FURNACE

[75] Inventors: Kazuharu Yatsunami, Nishiohimachi; Hisashi Watanabe; Yoshiro Suzawa, both of Himeji, all of Japan

[73] Assignees: Nippon Kokan Kabushiki Kaisha; Toshin Seiko Kabushiki Kaisha, both of Tokyo; Himeji Tekko Refine Co., Ltd., Himeji, all of Japan

[21] Appl. No.: 289,197

[22] Filed: Aug. 3, 1981

[30] Foreign Application Priority Data

Aug. 13, 1980 [JP] Japan ................... 55-110348

[51] Int. Cl.³ ............................................. C22B 7/02
[52] U.S. Cl. ........................................ 75/25; 75/77; 75/88; 423/97; 423/108
[58] Field of Search .............. 75/25, 88, 77; 266/173; 423/97, 108

[56] References Cited

U.S. PATENT DOCUMENTS 3,547,623 12/1970 Larpenteur ........................... 75/25

FOREIGN PATENT DOCUMENTS 1076156 2/1960 Fed. Rep. of Germany .
1130602 5/1962 Fed. Rep. of Germany .
52-11174 6/1977 Japan .................................... 75/25

*Primary Examiner*—M. J. Andrews

*Attorney, Agent, or Firm*—Frishauf, Holtz, Goodman & Woodward

[57] ABSTRACT

In a method for recovering zinc and lead from a dust containing ferric oxide, zinc oxide and lead oxide discharged from a metal refining metallurgical furnace, the dust is charged into the entry of a rotary kiln together with a granular carbonaceous reducing agent. The atmosphere of the interior of the kiln comprises a reducing atmosphere zone accounting for a major portion of the interior including the entry section of the kiln and an oxidizing atmosphere zone accounting for a minor portion of the interior including at least a part of the exit section of the kiln. The temperature of the interior of the kiln is increased by the combustion of a fuel from at least one burner installed at the exit section of the kiln directed toward the interior of the kiln. The dust is reduced in the reducing atmosphere zone to vaporized zinc and lead, and also to reduce the ferric oxide into ferrous oxide. The resultant zinc and lead are reoxidized in the oxidizing atmosphere zone, and discharged from the kiln, together with exhaust gases produced in the kiln to recover zinc and lead. The method includes the characterizing step of reoxidizing the ferrous oxide into the ferric oxide in the oxidizing atmosphere zone. The characterizing step has an effect enabling saving an amount of the reducing agent used as the fuel which corresponds to the amount necessary to generating the heat corresponding to that obtained by the reoxidation heat of the ferrous oxide.

2 Claims, 3 Drawing Figures

METHOD FOR RECOVERING USEFUL METALS FROM DUST DISCHARGED FROM METAL REFINING METALLURGICAL FURNACE

REFERENCE TO PATENTS, APPLICATIONS AND PUBLICATIONS PERTINENT TO THE INVENTION (1) Japanese Patent Provisional Publication No. 52,111/74 dated May 21, 1974.

The contents of the above-mentioned prior document will be described later under the heading of the "BACKGROUND OF THE INVENTION".

FIELD OF THE INVENTION

The present invention relates to a method for recovering useful metals from a dust discharged from a metal refining metallurgical furnace, which permits efficient recovery of such useful metals as zinc, lead and other metals from a dust containing principally ferric oxide ($Fe_2O_3$), zinc oxide (ZnO) and lead oxide (PbO) discharged from the metal refining metallurgical furnace.

BACKGROUND OF THE INVENTION

For example, when manufacturing steel from steel scrap including scrap of galvanized steel sheets in a steelmaking electric furnace, the amount of dust produced during refining ranges from 13 to 17 kg per ton of molten steel, thus giving a huge annual production. This dust has a chemical composition as shown in the following Table 1.

TABLE 1

| (wt. %) | | | | | | | | |
|---|---|---|---|---|---|---|---|---|
| T.Fe | Zn | Pb | Cd | C | Cl | F | Na | K |
| 20 to 40 | 10 to 30 | 1 to 6 | 0.1 to 0.5 | 0.5 to 1.5 | 2 to 5 | 0.3 to 1.0 | 1 to 4 | 0.5 to 3.0 |

As shown in Table 1, the dust contains, in addition to iron, such useful metals as zinc, lead and other metals in the form of oxides in large quantities, and this dust has often been rejected as waste. However, to reject the dust with the above-mentioned chemical composition is very uneconomical from the point of view of effectively utilizing resources. Furthermore, since the aforementioned useful metals are toxic substances on the other hand, rejection of the dust having the above-mentioned chemical composition is a serious problems in environment control.

For these reasons, studies have been carried out actively in various circles concerned to find a method for recovering such useful metals as zinc, lead and other metals from a dust containing principally ferric oxide, zinc oxide and lead oxide, and as a result, the reducing volatilization process by rotary kiln has been industrialized as a relatively easy method.

With regard to the conventional reducing volatilization proces by rotary kiln as described above, the following proposal is made:

(1) A method for treating a dust discharged from a steelmaking furnace, disclosed in Japanese Patent Provisional publication No. 52,111/74 dated May 21, 1974, which comprises:

Charging a dust discharged from a steelmaking furnace, together with a solid carbonaceous reducing agent, into a rotary kiln, evaporating by reduction zinc oxide and lead oxide contained in the dust by heating the dust in the rotary kiln to separate zinc and lead from the dust; discharging from the rotary kiln, zinc and lead thus separated from the dust, together with exhaust gases produced in the rotary kiln, and recovering zinc and lead; carrying out a primary treatment comprising recovering iron powder through magnetic separation of clinker containing reduced iron after recovery of zinc and lead; then, carrying out a secondary treatment comprising charging again non-magnetic substances produced during said primary treatment into the rotary kiln and recovering zinc and lead remaining in said non-magnetic substances; recovering non-magnetic substances, principally comprising carbon produced during said secondary treatment; and then, using said non-magnetic substances thus recovered as a reducing agent (hereinafter referred to as the "prior art").

However, the aforementioned prior art involves the following problems.

(1) Recovery efficiency of useful metals from the dust is low.

(2) As a result of the low recovery efficiency of useful metals from the dust, a solid carbonaceous reducing agent is required in an amount of from 25 to 30 wt. % of the dust, and industrial treatment of the dust in a large quantity requires a large-capacity rotary kiln.

(3) Therefore, high running and installation costs are required for recovering useful metals from the dust.

Under such circumstances, there is a strong demand for the development of a method for efficiently recovering such useful metals as zinc, lead and other metals from a dust containing principally ferric oxide, zinc oxide and lead oxide discharged from a metal refining metallurgical furnace, which method requires only low running and installation costs. However, such a method is not as yet proposed.

SUMMARY OF THE INVENTION

A principal object of the present invention is therefore to provide a method for efficiently recovering such useful metals as zinc, lead and other metals from a dust containing principally ferric oxide, zinc oxide and lead oxide discharged from a metal refining metallurgical furnace, which method requires only low running and installation costs.

In accordance with one of the features of the present invention, there is provided: in a method for recovering useful metals from a dust discharged from a metal refining metallurgical furnace, which comprises:

charging into a rotary kiln from the entry thereof a dust principally containing ferric oxide ($Fe_2O_3$), zinc oxide (ZnO) and lead oxide (PbO), discharged from a metal refining metallurgical furnace, together with a granular carbonaceous reducing agent; moving said dust and said reducing agent toward the exit of said rotary kiln; the interior of said rotary kiln comprising a reducing atmosphere zone accounting for a major portion including the entry section and an oxidizing atmosphere zone including the exit section, the temperature of said oxidizing atmosphere zone being increased by at least one burner horizontally installed toward the interior of said rotary kiln at said exit section; evaporating by reduction zinc oxide and lead oxide in said dust by means of said reducing agent in said reducing atmosphere zone in said rotary kiln to separate zinc and lead from said dust; and, discharging zinc and lead thus separated from said rotary kiln, together with exhaust gases produced in said rotary kiln, and recovering zinc and lead;

the improvement characterized in that:

Said granular carbonaceous reducing agent is charged in the total amount of an amount necessary for reducing ferric oxide ($Fe_2O_3$) contained in said dust into ferrous oxide (FeO), an amount necessary for reducing zinc oxide and lead oxide contained in said dust, and an amount necessary as a heat source for said respective reductions;

thereby, reducing ferric oxide ($Fe_2O_3$) contained in said dust into ferrous oxide (FeO) in said reducing atmosphere zone; reoxidizing ferrous oxide (FeO) into tri-iron tetroxide ($Fe_3O_4$) and ferric oxide ($Fe_2O_3$) in said oxidizing atmosphere zone; and, increasing the temperature of the portion of said reducing atmosphere zone near said oxidizing atmosphere zone through combustion of said reducing agent as the heat source in said oxidizing atmosphere zone, thereby accelerating said reduction of zinc oxide and lead oxide in said portion of the reducing atmosphere zone near said oxidising atmosphere zone.

DETAILED DESCRIPTION OF THE PREFERRED EMBODIMENTS

Figure 1:
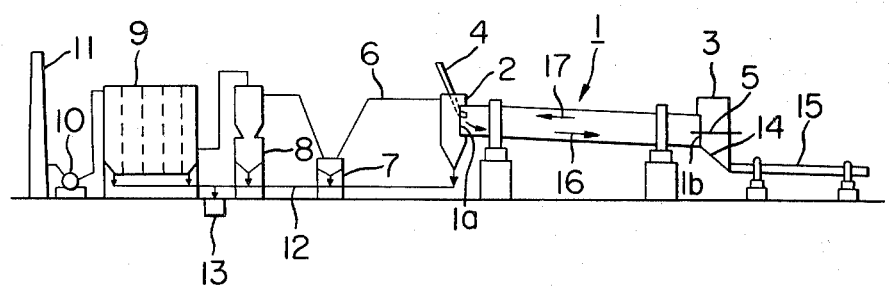
FIG. 1 is a schematic descriptive view illustrating an embodiment of the method of the present invention.

From the above-mentioned point of view, we carried out extensive studies with a view to developing a method for efficiently recovering such useful metals as zinc, lead and other metals from a dust containing principally ferric oxide, zinc oxide and lead oxide discharged from a metal refining metallurgical furnace, which method requires only low running and installation costs. The granular carbonaceous reducing agent to be charged into a rotary kiln in the conventional method is used in an amount equal to the total amount of the amount necessary for reducing zinc oxide, lead oxide and other metal oxides contained in the dust, the amount necessary to reducing ferric oxide contained in the dust into metallic iron (Fe), and the amount necessary as a heat source for the reduction process, and as a result, the amount of charged granular carbonaceous reducing agent reaches such a high level as from 25 to 30 wt. % of the dust, thus bringing about increase in the running costs and decrease in the dust treating efficiency.

We continued further studies, giving attention to this point, on the effective amount of charged granular carbonaceous reducing agent, and the temperature in the rotary kiln for efficiently reducing zinc oxide, lead oxide and other metal oxides contained in the dust. As a result, it was found possible to efficiently reduce zinc oxide, lead oxide and other metal oxides contained in the dust and to recover useful metals thus reduced by using the granular carbonaceous reducing agent for reducing ferric oxide contained in the dust in the amount necessary for reducing the ferric oxide into ferrous oxide, reoxidizing the ferrous oxide into tri-iron tetroxide and ferric oxide in the oxidizing atmosphere zone at the exit of the rotary kiln, and rapidly increasing the temperature at the portion near the exit of the rotary kiln with the use of reoxidizing heat thus produced.

The present invention was made on the basis of the above-mentioned finding, and the method for recovering useful metals from a dust discharged from a metal refining metallurgical furnace is as follows:

in a method for recovering useful metals from a dust discharged from a metal refining metallurgical furance, which comprises:

charging into a rotary kiln from the entry thereof a dust principally containing ferric oxide ($Fe_2O_3$), zinc oxide (ZnO) and lead oxide (PbO), discharged from a metal refining metallurgical furnace, together with a granular carbonaceous reducing agent; moving said dust and said reducing agent toward the exit of said rotary kiln; the interior of said rotary kiln comprising a reducing atmosphere zone accounting for a major portion including the entry section and an oxidizing atmosphere zone including the exit section, the temperature of said oxidizing atmosphere zone being increased by at least one burner horizontally installed toward the interior of said rotary kiln at said exit section; evaporating by reduction zinc oxide and lead oxide in said dust by means of said reducing agent in said reducing atmosphere zone in said rotary kiln to separate zinc and lead from said dust; and discharging zinc and lead thus separated from said rotary kiln, together with exhaust gases produced in said rotary kiln, and recovering zinc and lead;

the improvement characterized in that:

Said granular carbonaceous reducing agent is charged into said rotary kiln in the total amount of an amount necessary for reducing ferric oxide ($Fe_2O_3$) contained in said dust into ferrous oxide (FeO), an amount necessary for reducing zinc oxide and lead oxide contained in said dust, and an amount necessary as a heat source for said respective reductions;

thereby, reducing ferric oxide ($Fe_2O_3$) contained in said dust into ferrous oxide (FeO) in said reducing atmosphere zone; reoxidizing ferrous oxide (FeO) into tri-iron tetroxide ($Fe_3O_4$) and ferric oxide ($Fe_2O_3$) in said oxidizing atmosphere zone; and, increasing the temperature of the portion of said reducing atmosphere zone near said oxidizing atmosphere zone through combustion of said reducing agent as the heat source in said oxidizing atmosphere zone, thereby accelerating said reduction of zinc oxide and lead oxide in said portion of the reducing atmosphere zone near said oxidizing atmosphere zone.

Now, the method of the present invention is described with reference to the drawings.

FIG. 1 is a schematic descriptive view illustrating an embodiment of the method of the present invention. In FIG. 1, 1 is a rotary kiln having a dust charging entry 1a at an end thereof and a clinker discharging exit 1b at the other end thereof; 2 is an entry hood installed adjacent to the entry 1a of the rotary kiln 1; 3 is an exit hood installed adjacent to the exit 1b of the rotary kiln 1; 4 is a dust charging chute provided in the entry hood 2; 5 is a burner, provided horizontally movably toward the interior of the rotary kiln 1 in the exit 1b section, for increasing the temperature of the exit 1b section in the rotary kiln 1; 6 is a duct, connected to the entry hood 2, for discharging exhaust gases produced in the rotary kiln 1; 7 is a chamber for recovering coarse granular dust contained in the exhaust gases; 8 is a cyclone for separating and recovering fine dust contained in the exhaust gases; 9 is a bag filter type dust collector for separating and recovering fine dust not separated and not recovered by the chamber 7 and the cyclone 8; 10 is a fan; 11 is a chimney; 12 is a transfer mechanism such as a pan conveyor for transporting dust collected respectively at the entry hood 2, the chamber 7, the cyclone 8, and the bag filter type dust collector 9; 13 is a pit for containing and taking out the dust transported by the transfer mechanism 12; 14 is a chute installed in the exit hood 3 for discharging clinker; and, 15 is a rotary cooler for cooling the clinker.

The interior of the rotary kiln 1 comprises a reducing atmosphere zone taking a major portion of the interior of the rotary kiln 1 including the entry 1a section, and an oxidizing atmosphere zone including the exit 1b section. In order to make the portion near the exit 1b of the rotary kiln 1 an oxidizing atmosphere zone, it suffices to cause air in an appropriate amount to come into the rotary kiln 1 through the exit 1b by adjusting the pressure in the rotary kiln 1 through opening of a pressure adjusting damper (not shown) installed in the fan 10.

Dust to be treated is charged, together with a granular carbonaceous reducing agent, into the rotary kiln 1 from the entry 1a through the chute 4 installed in the entry hood 2, and then, moved through the interior of the rotary kiln 1 in the direction as indicated by the arrow 16 in accordance with the rotation of the rotary kiln 1 toward the exit 1b. Dust to be charged into the rotary kiln 1 should preferably be granulated in advance into particles with a size of from 4 to 20 mm diameter by a granulating machine and dried into dust pellets having a prescribed strength. The granular carbonaceous reducing agent to be charged into the rotary kiln 1 to reduce the dust comprises coke and highly reactive coal with a high volatile matter content at a prescribed ratio. The granular carbonaceous reducing agent is charged into the rotary kiln 1 in an amount equal to the total amount of the amount necessary for reducing ferric oxide ($Fe_2O_3$) contained in the dust into ferrous oxide (FeO), the amount necessary for reducing zinc oxide, lead oxide and other metal oxides contained in the dust, and the amount necessary as a heat source for the above-mentioned reduction. The aforementioned amount necessary as the heat source for the reduction should preferably be up to substantially the total amount of the amount necessary for reducing ferric oxide ($Fe_2O_3$) into ferrous oxide (FeO), and the amount necessary for reducing zinc oxide, lead oxide and other metal oxides.

Figure 2:
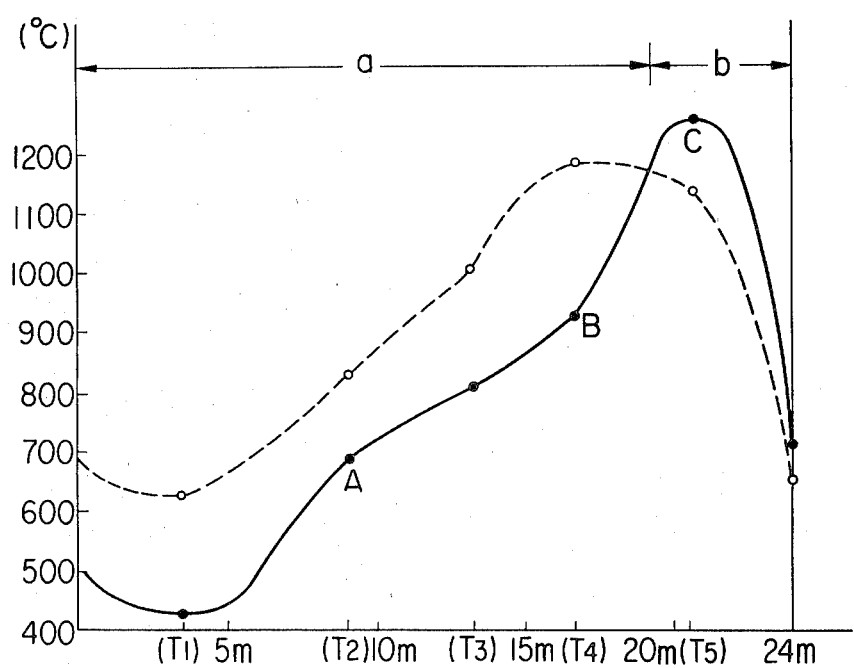
FIG. 2 is a graph illustrating the temperature distribution in the rotary kiln in the method of the present invention; and, FIG. 3 is a schematic cross-sectional view illustrating a portion near the exit of the rotary kiln used in the method of the present invention.

FIG. 2 is a graph illustrating the temperature distribution of atmosphere in a rotary kiln 1 having, for example, a length of 24 m. In FIG. 2, the portion "a" indicates a reducing atmosphere zone, and the portion "b", an oxidizing atmosphere zone. The abscissa represents the distance from the entry 1a of the rotary kiln 1, and the ordinate, the temperature of atmosphere in the rotary kiln 1. $T_1$, $T_2$, $T_3$, $T_4$ and $T_5$ marked along the abscissa are temperature measuring positions.

In the present invention, the temperature of atmosphere in the rotary kiln 1 is kept, as shown by the solid curve in FIG. 2, at a temperature of up to about 700° C. for the reducing atmosphere zone which covers about one third of the total length of the rotary kiln 1 from the entry 1a of the rotary kiln 1 to the point A, and at a temperature within the range of from about 700 to about 900° C. for the reducing atmosphere zone which covers about two thirds of the total length of the rotary kiln 1 from the point A to the point B. And, the temperature of atmosphere in the rotary kiln 1 is rapidly increased to a temperature of at least from about 900 to about 1,200° C. for the portion from the point B up to the point C in the oxidizing atmosphere zone near the exit 1b.

The dust is charged into the rotary kiln 1 having the above-mentioned temperature of atmosphere from the entry 1a thereof together with the granular carbonaceous reducing agent and moved toward the exit 1b thereof. In the reducing atmosphere zone of up to the above-mentioned point A, ferric oxide ($Fe_2O_3$) contained in the dust is reduced to tri-iron tetroxide ($Fe_3O_4$), and in the reducing atmosphere zone of from the point A to the point B, the aforementioned tri-iron tetroxide ($Fe_3O_4$) is reduced to ferrous oxide (FeO). Then, in the reducing atmosphere zone of from the point B to the aforementioned point C, where the temperature is increased rapidly, zinc oxide (ZnO), lead oxide (PbO) and other metal oxides are actively reduced and evaporated. Zinc, lead and other metals thus separated from the dust are reoxidized by oxygen present in the interior of the rotary kiln 1 again into zinc oxide, lead oxide and other metal oxides. These metal oxides including zinc oxide and lead oxide are discharged, together with exhaust gases produced in the rotary kiln 1 and flowing in the arrow 17 direction, from the entry 1a of the rotary kiln 1.

The exhaust gases containing zinc oxide, lead oxide and other metal oxides discharged from the entry 1a of the rotary kiln 1 are directed, through a duct 6 installed in the entry hood 2, sequentially from the chamber 7 to the cyclone 8 and the bag filter type dust collector 9, and after recovery of zinc oxide, lead oxide and other metal oxides by the above-mentioned chamber 7, the cyclone 8 and the bag filter type dust collector 9, discharged to open air from the chimney 11. Zinc oxide, lead oxide and other metal oxides thus recovered are transported to outside, after being gathered in the pit 13 by a transfer mechanism 12 such as a pan conveyor.

On the other hand, ferrous oxide (FeO) in the dust reduced in the course of up to the above-mentioned point B is reoxidized into tri-iron tetroxide ($Fe_3O_4$) and ferric oxide ($Fe_2O_3$) in the oxidizing atmosphere zone, thus discharged in the form of a clinker containing iron oxides, together with other residues in the dust, from the exit 1b into the exit hood 3, and then, after being cooled to a prescribed temperature in the rotary cooler 15, transported to outside.

In FIG. 2, the dotted curve represents an example of the distribution of the temperature of atmosphere in the rotary kiln 1 under the conventional reducing volatilization process. As is evident from the comparison with this conventional distribution, the temperature of atmosphere in the rotary kiln 1 in the present invention is kept at a relatively low temperature of up to 900° C. in the reducing atmosphere zone covering about two thirds of the total length of the rotary kiln 1 from the entry 1a of the rotary kiln 1 to the point B, and rapidly increased to a temperature of at least about 1,200° C. in the course of from the above-mentioned point B to the point C in the oxidizing atmosphere zone near the exit 1b. Therefore, zinc oxide, lead oxide and other metal oxides contained in the dust are not reduced in the reducing atmosphere zone with a relatively low temperature extending to the above-mentioned point B, but are reduced at a very high efficiency in the reducing atmosphere zone of from the point B to the point C, where the temperature increases rapidly.

Concrete means to achieve the above-mentioned temperature distribution of atmosphere in the rotary kiln 1 in the present invention are described later. The temperature in the oxidizing atmosphere zone near the exit 1b of the rotary kiln 1 increases to over 1,200° C. since ferrous oxide is reoxidized into tri-iron tetroxide and ferric oxide, and the reducing agent as the heat source is burnt. This increases the temperature in the portion of the reducing atmosphere zone near the oxidizing atmosphere zone, thus accelerating reduction of zinc oxide, lead oxide and other metal oxides in the portion of the reducing atmosphere zone near the oxidizing atmosphere zone.

It is possible to efficiently recover such useful metals as zinc, lead and other metals from the dust with the use of a smaller quantity of granular carbonaceous reducing agent and a shorter length rotary kiln 1 than those ever used in the conventional method, by keeping the temperature of atmosphere in the rotary kiln 1 to a temperature of up to 900° C. for the reducing atmosphere zone taking about two thirds of the total length of the rotary kiln 1, and rapidly increasing the temperature of atmosphere to above 1,200° C. in the remaining zone taking about one third thereof, as described above. Furthermore, by achieving a high temperature of at least 1,200° C. near the exit 1b of the rotary kiln 1, scaffolding, if it occurs on the inner wall near the exit 1b, immediately becomes semi-molten and melts down. Such scaffolding therefore never grows larger.

Figure 3:
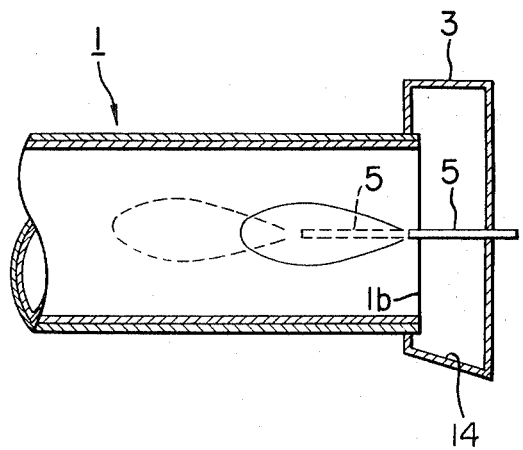

FIG. 3 is a schematic cross-sectional view illustrating the portion of the rotary kiln 1 near the exit 1b thereof. As shown in FIG. 3, by making the burner 5, which is horizontally installed toward the interior of the rotary kiln 1 in the exit 1b section of the rotary kiln 1 for increasing the temperature of the oxidizing atmosphere zone, in a horizontally movable position as shown by the dotted line, it is possible to control the position of the point C which represents the highest temperature in the oxidizing atmosphere zone shown in FIG. 1. When abnormal scaffolding occurs near the exit 1b, it is possible to melt such scaffolding and remove it by shifting the burner 5 so that the tip of the burner 5 is located at the position of the scaffolding.

In order to achieve the above-mentioned distribution of the temperature of atmosphere in the rotary kiln 1, the temperature is measured in the longitudinal direction of the rotary kiln 1 by temperature-measuring probes installed at prescribed positions $T_1$, $T_2$, $T_3$, $T_4$ and $T_5$, and the temperature in the rotary kiln 1 is controlled on the basis of the difference between the value of temperature thus measured and the predetermined standard value of temperature for the individual prescribed positions. An example of the means for controlling the temperature is described below.

(1) Control based on pressure in the rotary kiln:

The amount of air coming through the exit 1b into the rotary kiln 1 is controlled by adjusting the pressure in the rotary kiln 1 by means of the opening of the pressure adjusting damper (not shown) installed in the fan 10, and thus, the reoxidation of ferrous oxide in the oxidizing atmosphere zone and the combustion of the granular carbonaceous reducing agent as the heat source are controlled. More specifically, the temperature in the rotary kiln 1 is increased by reducing the pressure in the rotary kiln 1, and is decreased by increasing the pressure in the rotary kiln 1.

(2) Control by burner:

The temperature in the oxidizing atmosphere zone and the position of the maximum temperature in the oxidizing atmosphere zone are controlled by controlling the amount of fuel oil and air ejected from the burner 5 installed in the exit hood 3 of the rotary kiln 1 into the rotary kiln 1, and by changing the position of the tip of the burner 5 in the rotary kiln 1 by moving the burner 5 horizontally.

(3) Control of the amount of supply of granular carbonaceous reducing agent:

This practice comprises controlling the amount of the granular carbonaceous reducing agent prepared by blending at a prescribed ratio of coke and highly reactive coal with a high volatile matter content to be charged into the rotary kiln 1 together with the dust. More particularly, the temperature in the rotary kiln 1 is increased by increasing the amount of charged granular carbonaceous reducing agent, and is decreased by reducing the amounts of charged granular carbonaceous reducing agent.

(4) Control of blending ratio of coke and coal in the granular carbonaceous reducing agent:

This practice comprises controlling the blending ratio of coke and highly reactive coal with a high voltatile matter content in the granular carbonaceous reducing agent charged into the rotary kiln 1 together with the dust. The temperature in the rotary kiln 1 is increased by increasing the above-mentioned blending ratio of coal, and is descreased by reducing the above-mentioned blending ratio of coal. Thus, by using coke and coal in a prescribed ratio as the granular carbonaceous reducing agent, it is possible to properly control the temperature in the rotary kiln 1, and thus to effectively reduce the dust.

Now, the present invention is described in more detail by means of an example.

EXAMPLE

Pellets having a strength of about 15 kg were prepared by granulating a steelmaking electric furnace dust having the chemical composition shown in Table 2 into particles of a size of about 10 mm diameter by a granulator, and drying these particles at a temperature of 200° F. for about 20 minute.

TABLE 2

| | | | | | (wt. %) | | | | | | | | |
|---|---|---|---|---|---|---|---|---|---|---|---|---|---|
| $Fe_2O_3$ | ZnO | PbO | CdO | $SiO_2$ | CaO | $Al_2O_3$ | MnO | NaO | F | Cl | Na | K | C |
| 43.3 | 17.5 | 3.0 | 0.04 | 4.5 | 3.2 | 2.6 | 2.3 | 1.3 | 0.7 | 4.0 | 2.2 | 1.6 | 1.0 |

As the granular carbonaceous reducing agent, a coke and a coal having the properties as shown in Table 3 were employed.

TABLE 3

| | Ash content (wt. %) | Volatile matter content (wt. %) | Fixed carbon content (wt. %) | Calorific value (Kcal/kg) | Particle size diameter (mm) |
|---|---|---|---|---|---|
| Coke | 11.23 | 3.16 | 85.61 | 7,200 | 4 to 10 |
| Coal | 13.88 | 44.65 | 41.47 | 6,550 | up to 15 |

The dust in the form of the above-mentioned pellets and the granular carbonaceous reducing agent were charged into a rotary kiln 1 having a length of 24 m and a shell inside diameter of 3.2 m as shown in FIG. 1 from the entry 1a thereof. The dust was charged in an amount of 5,608 Kg/H ands the granular carbonaceous reducing agent, in an amount of 656 kg/H. In the above granular carbonaceous reducing agent, 425 kg/H of coke (75.8 kg per ton of dust) and 231 kg/H of coal (41.2 kg per ton of dust) were employed.

From a burner 5 installed in the exit 1b section of the rotary kiln 1 movably horizontally toward the interior of the rotary kiln 1, kerosene in an amount of 36 kg per ton of dust was blown together with air into the rotary kiln 1 and burnt. The temperature in the rotary kiln 1 was detected by means of temperature-measuring probes at the positions $T_1$, $T_2$, $T_3$, $T_4$ and $T_5$ as shown in FIG. 2, and was controlled so as to achieve the temperature profile as shown in FIG. 2 by the method described above.

As a result, ferric oxide contained in the dust was reduced into ferous oxide in the portion with a relatively low temperature ranging from the entry 1a of the rotary kiln 1 to the point B located at about two third of the total length of the rotary kiln 1. Then, in the portion from the above-mentioned point B to the point C in the oxidizing atmosphere zone near the exit 1b where the temperature increases rapidly, zinc oxide, lead oxide and other metal oxides were reduced, evaporated and separated from the dust. Zinc, lead and other metals thus separated from the dust were discharged from the rotary kiln 1 together with exhaust gases produced in the rotary kiln 1, and recovered by the chamber 7, the cyclone 8 and the bag filter type dust collector 9.

In the oxidizing atmosphere zone, on the other hand, ferrous oxide was reoxidized into tri-iron tetroxide and ferric oxide, and after increasing the temperature of the portion of the reducing atmosphere zone near the oxidizing atmosphere zone by high-temperature oxidation heat produced during this reoxidation, discharged from the exit 1b in the form of a clinker containing iron oxides, together with other residues. The amount of the recovered dust containing zinc oxide, lead oxide and other metal oxides was 1,480 kg/H, and the amount of the clinker was 3,650 kg/H. Table 4 shows the chemical composition of the recovered dust containing zinc oxide, lead oxide and other metal oxides, and Table 5 gives the chemical composition of the discharged clinker.

TABLE 4

| (wt. %) | | | | | | | | | |
|---|---|---|---|---|---|---|---|---|---|
| FeO | $Fe_2O_3$ | ZnO | PbO | CdO | F | Cl | Na | K | C |
| 0.08 | 3.98 | 51.7 | 9.1 | 0.14 | 0.6 | 12.0 | 1.0 | 0.2 | 0.9 |

TABLE 5

| (wt. %) | | | | | | | | | | | | | | | |
|---|---|---|---|---|---|---|---|---|---|---|---|---|---|---|---|
| FeO | $Fe_2O_3$ | ZnO | PbO | $SiO_2$ | CaO | $Al_2O_3$ | MnO | MgO | F | Cl | Na | K | C | S | P | Cu |
| 32.5 | 32.7 | 2.5 | 0.5 | 8.6 | 4.9 | 3.4 | 5.1 | 2.5 | 0.7 | 0.8 | 2.0 | 0.2 | 0.9 | 0.6 | 0.17 | 0.12 |

The amount of solid carbon in the granular carbonaceous reducing agent used in the example and the consumption of this solid carbon for the individual reduction reactions and as the heat source were as follows:
(1) Amount of solid carbon in the granular carbonaceous reducing agent:
  a. Coke:
   Amount of charge: 425 kg/H
   Amount of solid carbon: 425 kg/H = 85.61 = 363.8 kg/H where, the percentage of 85.61% in the equation represents the solid carbon content in coke.
  b. Coal:
   Amount of charge: 231 kg/H
   Amount of solid carbon: 231 kg/H × 41.47% = 95.8 kg/H where, the percentage of 41.47% in the equation represents the solid carbon content in coal.
  c. Total amount of solid carbon: 459.6 kg/H
(2) Consumption of solid carbon:
  a. Amount consumed for reduction of ferric oxide: 80.1 kg/H
  b. Amount consumed for reduction of zinc oxide: 140.6 kg/H
  c. Amount consumed for reduction of lead oxide: 7.8 kg/H
  d. Amount consumed for reduction of cadmium oxide: 0.2 kg/H
  e. Amount consumed as heat source: 230.9 kg/H Table 6 shows the consumption of the granular carbonaceous reducing agent per ton of dust and the amount of treated dust per day per $m^3$ of the effective volume of the rotary kiln in the method of the present invention and the conventional method.

TABLE 6

| | Consumption of granular carbonaceous reducing agent (kg/t) | | | Amount of treated dust |
|---|---|---|---|---|
| | Coke | Coal | Total | (t/day · $m^3$) |
| Method of the invention | 75.8 | 41.2 | 117.0 | 0.518 |
| Conventional method | 250 to 300 | — | 250 to 300 | 0.400 |

According to the method of the present invention, as described above, it is possible to efficiently recover such useful metals as zinc, lead and other metals from a dust produced during refining in a metal refining metallurgical furnace, with the use of a granular carbonaceous reducing agent in an amount of under a half of that in the conventional method. Furthermore, since the amount of treated dust per day per $m^3$ of rotary kiln is improved to extent of about 1.3 times as large as that in the conventional method, the rotary kiln may be of a smaller capacity, requiring lower running and installation costs than those in the conventional method, thus providing industrially useful effects.

What is claimed is:
1. In the method for recovering useful metals from dust discharged from a metal refining metallurgical furnace which contains $Fe_2O_3$, Zno and PbO, which comprises:
charging into the entry of a rotary kiln, a granular carbonaceous reducing agent, and said dust containing $Fe_2O_3$, ZnO and PbO; the amount of said granular carbonaceous reducing agent being equal to the amount necessary to reduce the ZnO and PbO contained in said dust, to reduce the $Fe_2O_3$ contained in said dust to FeO, and an amount necessary as fuel to supply the heat required for said reductions; moving said dust and said reducing agent toward the exit of said rotary kiln; the atmosphere in the interior of said rotary kiln comprising a reducing atmosphere zone for a major portion of said interior starting from the entry section of said rotary kiln and an oxidizing atmosphere zone which is a minor portion of said interior including at least a part of the exit section of said rotary kiln, the temperature of said interior of said rotary kiln being increased by the combustion of a fuel horizontally ejected from at least one burner installed at said exit section of said rotary kiln toward said interior of said rotary kiln; reducing said ZnO to Zn, said PbO to lead Pb and said $Fe_2O_3$ to FeO in said reducing atmosphere zone, and vaporizing said Zn and said Pb to separate said Zn and Pb from said dust; reoxidizing, in said oxidizing atmosphere zone, said Zn and said Pb thus separated; and, discharging the resultant ZnO and PbO, together with exhaust gases produced in said rotary kiln, from said rotary kiln, and recovering said ZnO and PbO;

the improvement comprising reoxidizing said FeO into $Fe_3O_4$ and $Fe_2O_3$ in said oxidizing atmosphere zone thereby lowering the amount of said reducing agent used as the fuel by an amount corresponding to the heat obtained from the reoxidation heat of said FeO.

2. The method as claimed in claim 1, characterized in that:

said at least one burner is horizontally movable, thereby permitting control of the position of the highest temperature in said oxidizing atmosphere zone.

* * * * *

UNITED STATES PATENT AND TRADEMARK OFFICE
CERTIFICATE OF CORRECTION

PATENT NO. : 4,396,424

DATED : August 2, 1983

INVENTOR(S) : Kazuharu YATSUNAMI et al

It is certified that error appears in the above-identified patent and that said Letters Patent is hereby corrected as shown below:

Title page, left column, in the line under "3,547,623 12/1970 Larpenteur....75/25" insert --3,663,201 5/1972 Heitmann...75/36--.

Column 7, line 39, replace "1" with --2--.

Signed and Sealed this

Thirteenth Day of March 1984

[SEAL]

Attest:

GERALD J. MOSSINGHOFF

Attesting Officer

Commissioner of Patents and Trademarks